United States Patent Office 3,748,165
Patented July 24, 1973

3,748,165
NICKEL-COBALT ALUMINATE PIGMENTS
Brian Hill, Ramsey, N.J., assignor to The International Nickel Company, Inc., New York, N.Y.
No Drawing. Filed Jan. 26, 1972, Ser. No. 221,073
Int. Cl. C09c 1/36
U.S. Cl. 106—300        3 Claims

ABSTRACT OF THE DISCLOSURE

An improved inorganic, blue pigment of spinel structure which comprises a solid solution of about 15 to about 50 mole percent of nickel aluminate in cobalt aluminate. The improved pigment retains a greater degree of blueness when diluted 1 to 10 with titanium dioxide pigment than either cobalt aluminate pigment or nickel aluminate pigment.

---

The present invention is concerned with inorganic pigments and, more particularly, with improved blue pigments of the type generally known as "Thenard's Blue."

Inorganic blue pigments and inorganic pigments having a blue color vector have been known and used since prehistoric times. Many of these inorganic pigments have been based upon compositions which contain cobalt oxide in chemical union with silica, alumina and the like. Particularly, a product known variously as "cobalt blue," "Thenard's Blue," "cobalt ultramarine," "King's Blue" and "Leyden Blue" which comprises a blue pigment of variable composition consisting essentially of cobalt oxide and alumina has been a commercial product since early in the nineteenth century. The commercial product is made by heating alumina with any of the following: (a) cobaltous oxide, or a material yielding this oxide on calcination; (b) cobalt phosphate; or (c) cobalt arsenate. It is also disclosed in the art that shades other than blue can be obtained by the co-use of cobalt oxide with zinc oxide, chromium oxide, iron oxide and the like when forming the aluminate type of pigment by heating cobalt oxide with alumina. Further, it is disclosed that small amounts of uncolored materials such as sodium fluoride, phosphorous pentoxide and the like can be present as mineralizers during the calcination of alumina and cobalt oxide in order to reduce the reaction temperature required from upwards of 1200° C. or 1300° C. down to about 1000° C. or even lower.

While cobalt aluminate pigments have been used widely for over a century, it is only relatively recently that their use has been considered seriously in organic coating formulations intended for long term, e.g., 20 year, outdoor exposure. An example of such a use is in the pre-finished building siding. In such a use the principal advantage of cobalt aluminate pigments comes to the fore, that is, long term resistance to fading by virtue of exposure to sunlight under usual outdoor exposure conditions. Because building siding is normally supplied in pastel shades, rather than the deep blue, characteristic of pure cobalt aluminate pigment, it is highly important that the color characteristics of a pigment be advantageous when the pigment is diluted by an order of magnitude, i.e., about 1 to 10, with a white pigment, e.g., titanium dioxide.

It has now been discovered that pigments comprising solid solutions of nickel aluminate in cobalt aluminate have highly advantageous color characteristics especially when diluted to pastel intensities with white pigments.

It is an object of the present invention to provide novel inorganic blue pigments.

Another object of the invention is to provide pastel tinted media employing the novel, inorganic blue pigments.

Other objects and advantages will become apparent from the following description.

Generally speaking, the present invention contemplates new pigments, i.e., finely divided solids insoluble in a medium in which they are to be dispersed, comprising along with residual mineralizers and diluents, if any, solid solutions of about 15 to about 50 mole percent of nickel aluminate in cobalt aluminate. Advantageously, the content of nickel aluminate is about 25 mole percent, i.e., about 20 to about 35 mole percent.

The novel pigments of the present invention can be made by calcining together pre-formed nickel and cobalt aluminates in the proper mole percentages at temperatures of about 1300° C. for up to about 50 hours, e.g., from 20 to 30 hours. Alternatively, cobalt oxide and nickel oxide (or phosphates or arsenates) can be intimately mixed with a stoichiometrical amount of aluminum oxide and calcined together in a single operation at about 1300° C. until the spinel structure is obtained. As is well known to those skilled in the art, mineralizers, modifiers and diluents can be used where desired. For example, less than 1 mole percent of sodium fluoride can be used as a mineralizer, small amounts of zinc oxide can be used to obtain greener shades in the pigment and small amounts of diluent such as aluminum oxide in excess over the stoichiometrical amount, titania, tin oxide and the like can be used to promote opacity, to modify the index of refraction and for other like purposes. The temperature of calcining, in the absence of mineralizers, should be no greater than about 1300° C. to avoid difficulty in grinding and should be no less than about 1100° C. to assure interreaction of the mixture components in a reasonable amount of time. In general when mineralizers are used, the calcining temperature should be no greater than that necessary to produce the required reaction.

After pigments are formed by calcining, the pigments are then crushed and ground to a fine powder, i.e., to a fineness such that the powder particles will pass through a sieve having 325 meshes to the inch (i.e., a sieve having openings of about 0.044 millimeter (mm.)). The grinding can be accomplished by ball milling, wet or dry, attrition milling or the like. The resultant pigment particles are essentially inert to all common vehicle systems being the same in this respect as the traditional cobalt aluminate of commerce. Thus, the vehicles (media) in which the pigments of the invention are used can be any of the conventional air-drying or baking vehicles commonly used for long term outdoor exposure. Such vehicles include those based upon acid-catalyzed acrylic cross-linking resins, silicone resins, epoxy resins and the like. The pigments of the present invention can be used as well in the more traditional vehicles such as cellulose-based lacquers and vegetable oil and oil-modified alkyd vehicle systems.

When employing the pigments of the present invention in organic media, they are, as is conventional, ground into the media to form reasonably stable dispersions. This grinding is advantageously accomplished by ball milling in the media, by milling in a sand or shot grinder or by use of a colloid mill. Alternatively, especially when very fine grinds are required, use can be made of conventional two or three-roll mills. Pigments of the present invention are highly advantageous when used in conjunction with titania in amounts sufficient to give pastels, that is about 10 parts by weight of titania pigment to 1 part by weight of a pigment of the present invention. When used in dilution with titania, the titania and pigment of the invention are both carefully milled into the vehicle to be employed so as to provide an optically uniform system. When such is accomplished, there is provided an attractive pastel blue pigment system having substantially more intense blue color than similar systems made with cobalt aluminate pigment or nickel aluminate pigment.

In order to give those skilled in the art a greater understanding and appreciation of the invention, the following examples are given.

rinated hydrocarbon having a distillation range of 365° to 390° C. and sold under the trade designation of Aroclor 1254 and 50 parts by weight of diglyme.

TABLE

| Example number | Mole percent $NiAl_2O_4$ | Pigment += Red −= Green | Pigment += Yellow −= Blue | 1:1 tint Pigment += Red −= Green | 1:1 tint $TiO_2$ += Yellow −= Blue | 1:10 tint Pigment += Red −= Green | 1:10 tint $TiO_2$ += Yellow −= Blue |
|---|---|---|---|---|---|---|---|
| 1[1] | 0 | +11.3 | −47.6 | −3.9 | −44.4 | −10.9 | −7.1 |
| 2 | 25 | +13.5 | −61.0 | −2.3 | −48.1 | −10.0 | −24.0 |
| 3 | 50 | +7.4 | −51.5 | −6.8 | −35.9 | −11.8 | −18.0 |
|  | 100 | −16.1 | −10.5 | −18.6 | −7.3 | −16.5 | −1.7 |

[1] Pure $CoAl_2O_4$.

EXAMPLE I

About 15 mole percent of finely powdered nickel aluminate is mixed with about 85 mole percent of finely powder cobalt aluminate. The mixture is then calcined at 1300° C. for about 30 hours. A bright, intense blue pigment is thus obtained. The pigment is crushed and milled to pass through a sieve having openings of 0.044 mm.

EXAMPLE II

A blue pigment was made as in Example I using 25 mole percent nickel aluminate and 75 mole percent cobalt aluminate.

EXAMPLE III

A blue pigment was made as in Example I using 50 mole percent nickel aluminate and 50 mole percent cobalt aluminate.

EXAMPLE IV

The blue pigment of Example II was milled to pass through a sieve having mesh openings of 0.044 mm. and dispersed in an organic medium along with $TiO_2$ pigment in a ratio of 10 parts of $TiO_2$ to 1 part of the pigment of Example II to provide an optically uniform dispersion.

EXAMPLE V

The blue pigment of Example III was milled, diluted and dispersed to provide an optically uniform dispersion as in Example IV.

The cobalt aluminate and nickel aluminate used in the compositions of the examples were prepared by wire-milling stoichiometrical amounts (one mole each) of NiO and gamma $Al_2O_3$ for nickel aluminate ($NiAl_2O_4$) and CoO and gamma $Al_2O_3$ for cobalt aluminate ($CoAl_2O_4$) and calcining the mixtures in zirconia crucibles of 1300° C. for 30 hours. Samples of both cobalt aluminate and nickel aluminate were crushed, milled, sieved through a sieve having mesh openings of 0.044 mm. and dispersed in organic media both with and without diluting titania.

The following table contains data obtained by means of measurements with a Gardner Color Difference Meter C-4 (RD) of 10 mil thick (wet basis) drawdowns on standard Morest panels of undiluted pigment and 1:1 and 1:10 tints in $TiO_2$ (equal pigment loading of 0.5 gram per 2.5 grams of film former) which demonstrates that the pigments of the present invention are highly advantageous especially in 1:10 tints. The organic vehicle used in making the pigmented compositions, test results on which are reported in the following table, comprised 16 parts by weight of chlorinated rubber sold under the trade designation of Parlon S-20, 9 parts by weight of a chlo- The tabulated data show that the pigments of the present invention in mass tone are bluer than cobalt aluminate and that nickel aluminate is substantially less blue than cobalt aluminate. This effect is most pronounced however with a 1 to 10 titania dilution. The data of the table show that at this high dilution cobalt aluminate and the two pigments of the invention are essentially equal on the red-green scale but that the pigments of the present invention are substantially bluer. The very low blue value of nickel aluminate shows clearly that the color characteristics of the pigments of the present invention are not the result of additive characteristics of nickel aluminate and cobalt aluminate.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A blue, inorganic pigment having a spinel structure comprising a solid solution of about 15 to about 50 mole percent of nickel aluminate in cobalt aluminate, said pigment having the characteristic of retaining a greater degree of blueness than exhibited by either pigment cobalt aluminate or pigment nickel aluminate when the pigments are diluted by an order of magnitude with titanium dioxide in pigment form and the diluted pigment mixtures are dispersed in a medium to provide optically uniform systems.

2. A blue inorganic pigment as in claim 1 containing about 25 mole percent nickel aluminate.

3. A pigment system comprising the pigment of claim 1 diluted with about 10 parts by weight of titania pigment.

References Cited

UNITED STATES PATENTS

| | | | |
|---|---|---|---|
| 2,206,278 | 7/1940 | Dreyfus | 106—300 |
| 2,257,278 | 7/1941 | Schaumann | 106—300 |
| 3,037,876 | 6/1962 | Roseman et al. | 106—288 B |
| 3,079,269 | 2/1963 | Chrest et al. | 106—300 |
| 3,450,550 | 6/1969 | Linton | 106—300 |

DELBERT E. GANTZ, Primary Examiner

J. W. HELLWEGE, Assistant Examiner

U.S. Cl. X.R.

106—288 B